(12) United States Patent
Keller

(10) Patent No.: US 7,534,043 B2
(45) Date of Patent: May 19, 2009

(54) LINEAR UNIT WITH TOLERANCE COMPENSATION

(75) Inventor: Bernhard Keller, Wasserlosen (DE)

(73) Assignee: Bosch Rexroth Mechatronics GmbH, Schweinfurt (DE)

( * ) Notice: Subject to any disclaimer, the term of this patent is extended or adjusted under 35 U.S.C. 154(b) by 387 days.

(21) Appl. No.: 11/487,618

(22) Filed: Jul. 17, 2006

(65) Prior Publication Data

US 2007/0019893 A1 Jan. 25, 2007

(30) Foreign Application Priority Data

Jul. 20, 2005 (DE) .................. 10 2005 033 948

(51) Int. Cl.
*F16C 29/02* (2006.01)
(52) U.S. Cl. .............................. 384/40; 384/41; 384/42
(58) Field of Classification Search ................. 384/7, 384/26, 38, 39, 40, 41, 42
See application file for complete search history.

(56) References Cited

U.S. PATENT DOCUMENTS

| | | | |
|---|---|---|---|
| 1,917,926 A | | 7/1933 | Decker |
| 2,453,875 A | * | 11/1948 | Terhune ........................ 384/40 |
| 3,601,455 A | | 8/1971 | Spieth |
| 4,630,944 A | * | 12/1986 | Moehr .......................... 384/39 |
| 4,940,339 A | * | 7/1990 | Amano ......................... 384/25 |
| 5,938,340 A | | 8/1999 | Brodersen |
| 6,472,778 B2 | | 10/2002 | Keller |
| 2002/0181809 A1 | * | 12/2002 | Moshammer ................ 384/40 |

FOREIGN PATENT DOCUMENTS

| | | |
|---|---|---|
| DE | 1 750 244 | 1/1971 |
| DE | 198 25 806 | 12/1998 |
| EP | 1 120 585 | 8/2001 |

* cited by examiner

*Primary Examiner*—Thomas R Hannon
(74) *Attorney, Agent, or Firm*—Michael J. Striker

(57) ABSTRACT

A linear unit has a substantially rigid housing unit having an engagement slot, a rotor that is received in said housing unit so as to be movable back and forth in a travel direction, the rotor having at least one engagement device which engages the engagement slot in said housing unit in an engagement direction extending substantially orthogonally to the travel direction, the at least one engagement device including not only a contact unit associated with the rotor, but also a strip unit, and means for compensating a position of the strip units relative to the contact unit.

11 Claims, 4 Drawing Sheets

LINEAR UNIT WITH TOLERANCE COMPENSATION

CROSS-REFERENCE TO A RELATED APPLICATION

The invention described and claimed hereinbelow is also described in German Patent Application DE 10 2005 033 948.4 filed on Jul. 20, 2005. This German Patent Application, whose subject matter is incorporated here by reference, provides the basis for a claim of priority of invention under 35 U.S.C. 119(a)-(d).

BACKGROUND OF THE INVENTION

The present invention relates generally to linear units with tolerance compensation.

More particularly, the present invention relates to a linear unit, having a rotor that is received, such that it is movable back and forth in a travel direction, in a substantially rigid housing unit, in which the rotor has at least one engagement device, which engages an engagement slot of the housing unit, in an engagement direction extending substantially orthogonally to the travel direction.

One such linear unit is known for instance from European Patent Disclosure EP 1 120 585 A2. In this linear unit, two attachments, formed integrally on the rotor and laterally protruding from it and forming the engagement devices of this linear unit, engage two associated engagement slots, which are embodied in a housing unit of substantially U-shaped cross section. The engagement between the attachments of the rotor and the engagement slot of the housing unit, however, serves solely to guide the rotor in a vertical direction extending substantially parallel to the two side legs of the U-shape. The lateral guidance in a transverse direction extending substantially parallel to the base of the U, is assured by the lateral contact of the rotor with the U-shaped profile section.

This embodiment has proved to be disadvantageous, especially in linear units in which the housing unit is manufactured as an extruded profile element of a lightweight metal or a lightweight metal alloy, such as aluminum or an aluminum alloy. These disadvantages are due to problems with manufacturing tolerances and to the fact that the known linear unit does not allow any tolerance compensation.

SUMMARY OF THE INVENTION

Accordingly, it is an object of the present invention to provide a linear unit which eliminates the disadvantages of the prior art.

More particularly, it is the object of the invention to create a linear unit of the aforementioned generic type in which such a tolerance compensation is possible.

This object is attained, in a first aspect of the invention, by a linear unit in which the at least one engagement device can be brought into sliding engagement with a slide face on the slot bottom of the engagement slot, and in which the at least one engagement device includes not only a contact unit, associated with the rotor and having a contact face and at least one recess provided in the contact face, but also a strip unit, which has at least one first protrusion on a first surface and at least one second protrusion on a second surface facing away from the first surface, and in which the height of the at least one first protrusion and the height of the at least one second protrusion differ from one another, and in which both the at least one first protrusion and the at least one second protrusion are dimensioned such that they are capable of being introduced into the recess in the contact face of the contact unit.

In this way, with a single engagement device, a total of three tolerance compensation positions of the strip unit relative to the contact unit can be created: In a first tolerance compensation position, the at least one first protrusion engages the recess in the contact face of the contact unit, so that the strip unit rises above the contact face by a distance that is equivalent to the sum of the spacing of the first surface from the second surface of the strip unit, plus the height of the at least one second protrusion.

Conversely, in a second tolerance compensation position, the second protrusion engages the recess in the contact face, so that the strip unit rises above the contact face by a distance that is equivalent to the sum of the spacing of the first surface from the second surface of the strip unit, plus the height of the at least one first protrusion. In the third tolerance compensation position, either the at least one first protrusion or the at least one second protrusion rests on the contact face of the contact unit, so that the strip unit rises above the contact face by a distance that corresponds to the sum of the spacing of the first surface from the second surface of the strip unit, plus the height of the at least one first protrusion, plus the height of the at least one second protrusion.

If the at least one first protrusion and the at least one second protrusion have a different spacing from the two longitudinal ends of the strip unit, and if furthermore guide edges are provided, which define the relative position of the strip unit and the contact unit, then the three tolerance compensation positions can be implemented in a simple way, by inverting the strip unit into a corresponding position.

To make it possible to stabilize the engagement between the contact unit and the strip unit in the travel direction of the rotor, it is furthermore proposed that the strip unit has a plurality of first protrusions and/or a plurality of second protrusions.

To enable assuring the relative position of the contact unit and the strip unit, including in the vertical direction of the linear unit, it is furthermore proposed that at least one of the units, namely the contact unit and/or the strip unit, has at least one guide element for guiding the respective other unit or on the respective other unit. For instance, the contact unit may have a guide frame extending all the way around, into which the strip unit can be inserted. In terms of the height by which the at least one guide element or guide frame rises above the contact face of the contact unit, it should be noted that at most, it need be only as large as the shortest of the distances by which the strip unit rises above the contact face in the three tolerance compensation positions.

In a refinement of the first aspect of the invention, it is moreover proposed that between the contact unit and the strip unit, at least one spring element is provided, which prestresses the strip unit in sliding engagement with the slot bottom of the engagement slot. In this way, despite the graduation of the tolerance compensation positions, it can be assured that the strip unit will always be in sliding engagement with the slot bottom of the engagement slot. Moreover, in this way, slight fluctuations in tolerances can readily be compensated for.

In a second aspect of the invention, the object of the invention is attained by means of a linear unit of the generic type in which the at least one engagement device can be brought into sliding engagement with a slide face on the slot bottom of the engagement slot, and in which the at least one engagement device includes a contact unit, associated with the rotor and having a contact face, which forms an acute angle with the slide face, and also includes a strip unit, with a counterpart contact face, oriented toward the contact face and extending substantially parallel to it, and a counterpart slide face, facing toward the slide face and extending substantially parallel to it, and in which the strip unit can be fixed on the contact unit in the travel direction in a plurality of relative positions. In this aspect of the invention, the contact face of the contact unit is embodied as a wedge face, and the strip unit is embodied as a kind of sliding wedge, which can be fixed on the wedge face in a plurality of relative positions, and in each of relative positions, it extends variously far away from the rotor in the direction of the slide face of the engagement slot.

The fixation of the strip unit on the contact unit in the travel direction can be done for instance by means of at least one fastening bolt, which engages one of a plurality of fastening holes in the strip unit. This at least one fastening bolt may either be provided on the contact unit, or it may be a separate fastening element.

Analogously, the fixation of the strip unit on the contact unit in the travel direction can be done for instance by means of at least one fastening bolt, which engages one of a plurality of fastening holes in the strip unit. This at least one fastening bolt may either be provided on the strip unit, or it may be a separate fastening element.

If the at least one fastening bolt is embodied as a separate element, then on one of the units, either the strip unit or the contact unit, it is merely necessary for a number of fastening holes corresponding to the number of fastening bolts to be provided. In a refinement of the invention, however, preferably both the strip unit and the contact unit each have a plurality of fastening holes, and the spacing of the fastening holes of the strip unit and the spacing of the fastening holes of the contact unit from one another differs, for instance one spacing being half the other spacing. As a result, a relatively large number of relative positions can be made possible in a simple way. The at least one fastening bolt may for instance be a screw bolt.

Also in a refinement of the second aspect of the invention, it can be provided that at least one of the units, namely the contact unit and/or the strip unit, has at least one guide element for guiding the respective other unit or on the respective other unit. For instance, two guide strips, preferably mounted or embodied on the strip unit, may be provided above and below the contact unit, respectively.

Finally, in both aspects of the invention, one engagement device can be provided on each of both sides of the rotor, and/or at least two engagement devices can be provided on at least one side of the rotor.

In both aspects of the invention, the contact unit may be embodied on the rotor or can be mounted on it. In the latter case, the contact unit may be made from plastic, for instance as an injection-molded part. Furthermore, the strip unit can also be made of plastic, for instance as an injection-molded part.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
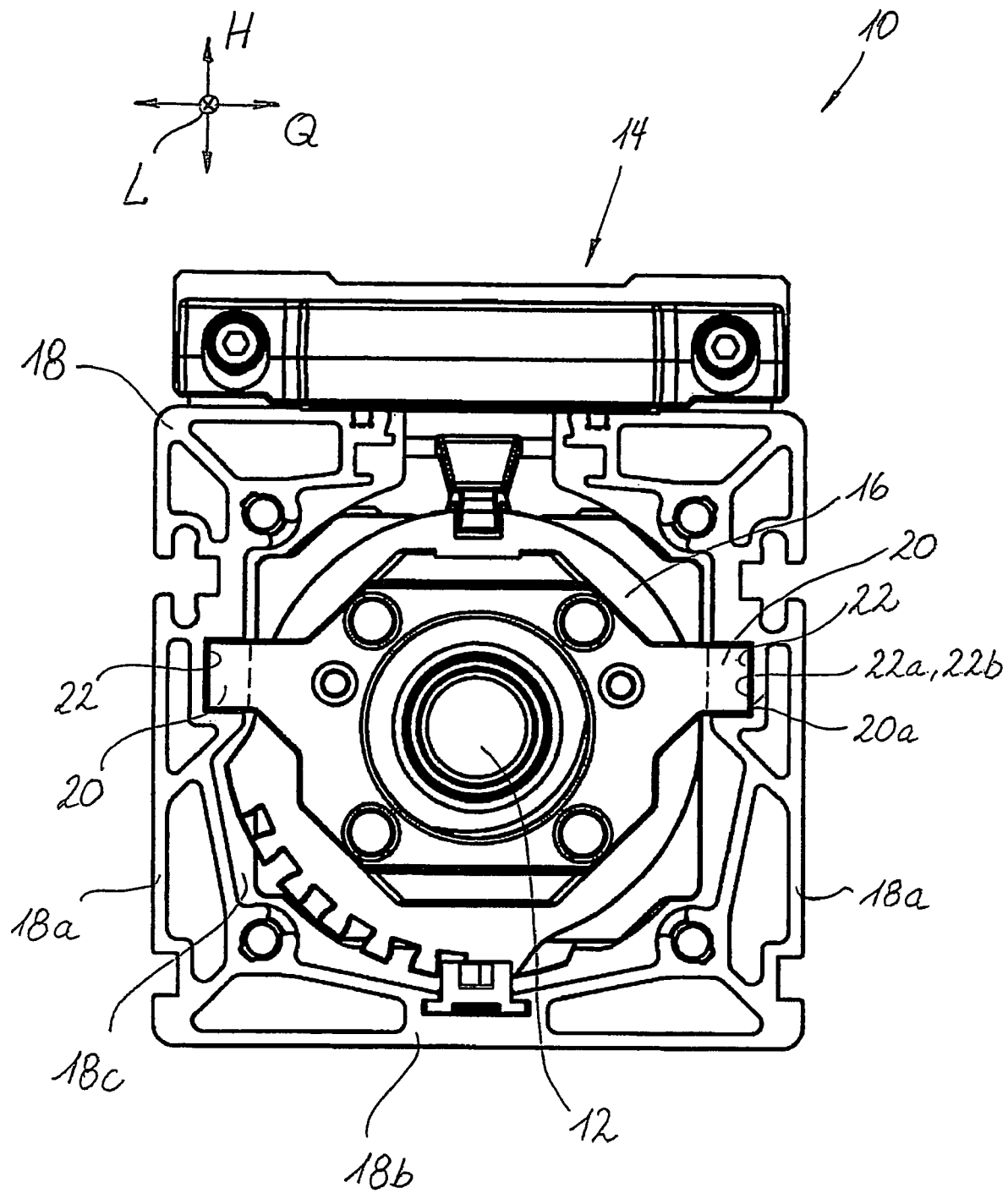
FIG. 1 is a sectional view, orthogonal to the travel direction of the rotor, for explaining the basic construction of a linear unit of the invention.

In FIG. 1, a linear unit embodied as a roller body screw assembly is shown as an example of a linear unit according to the invention and identified overall by reference numeral 10. It includes a threaded spindle 12 and a rotor 14 that is connected to the threaded spindle 12 via a threaded nut 16. The rotor 14 is guided displaceably in the travel direction L, by way of means not further shown, on a guide rail 18, which forms the housing unit of the linear unit 10. The guide rail or housing unit 18 is embodied as a profile section that is substantially U-shaped in cross section and that can be formed by extrusion, for instance, from a lightweight metal or a lightweight metal alloy, preferably aluminum or an aluminum alloy. The two side legs 18a of the U extend substantially in the vertical direction H of the linear unit 10, while the base 18b of the U extends essentially in the transverse direction Q of the linear unit 10.

The threaded spindle 12 is received in the interior 18c of the U and is rotatably supported on the guide rail 18 by its longitudinal ends, not shown in FIG. 1, or parts joined to the guide rail. The way in which, in this kind of roller body screw assembly, a rotation of the threaded spindle 12 is converted into a linear motion of the rotor 14 is well known and will therefore not be described in detail here.

The rotor 14 embracing the threaded spindle 12 has guide attachments 20 on both sides of the threaded spindle 12, and with them, in the transverse direction Q, it engages a guide slot 22 embodied on the guide rail 18; with a counterpart slide face 20a extending substantially orthogonally to the transverse direction, it is in sliding engagement with a slide face 22b embodied on the slot bottom 22a of the guide slot 22.

Figure 2:
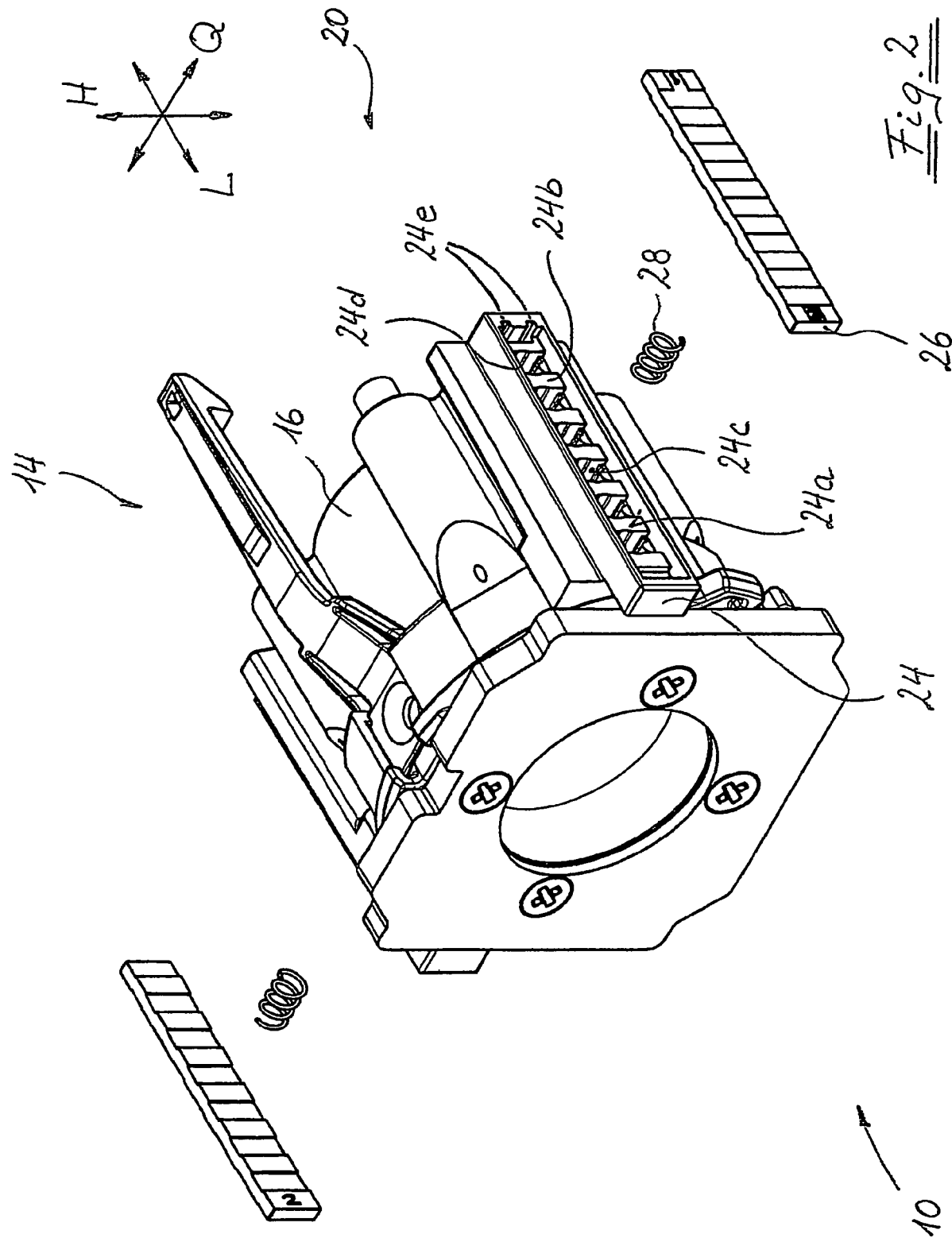
FIG. 2 is a perspective view, partly in the form of an exploded view, of a first embodiment of the rotor of the linear unit of the invention.

The guide attachments 20 of the rotor 14 are also provided, according to the invention, with a tolerance compensation function, which is represented only schematically in FIG. 1 by dashed lines and will be described below in further detail in conjunction with FIGS. 2 through 4:

As shown in FIG. 2, the guide attachment 20 includes a contact unit 24, secured to the rotor 14 or embodied on it, and a strip unit 26 that can be joined together with the contact unit 24. The contact unit 24 has a contact face 24a, which is formed by the end faces of a plurality of contact ribs 24b, between which a corresponding plurality of recesses 24c is provided. The strip unit 26, shown enlarged in FIG. 3, has a base body 26a, from one surface 26b of which first protrusions 26c rise, while second protrusions 26e rise from a second surface 26d that faces away from the first surface 26b. Between the two surfaces 26b and 26d, the base body 26a has a thickness d. Furthermore, the first protrusions 26c rise past the first surface 26b by a first height $h_1$, while the second protrusions 26e rise past the surface 26d by a height $h_2$. The width $b_1$ of the first protrusions 26c and the width $b_2$ of the second protrusions 26e are dimensioned such that the first protrusions 26c and the second protrusions 26e can readily be introduced into the recesses 24c that are provided between the contact ribs 24b.

Figure 3:
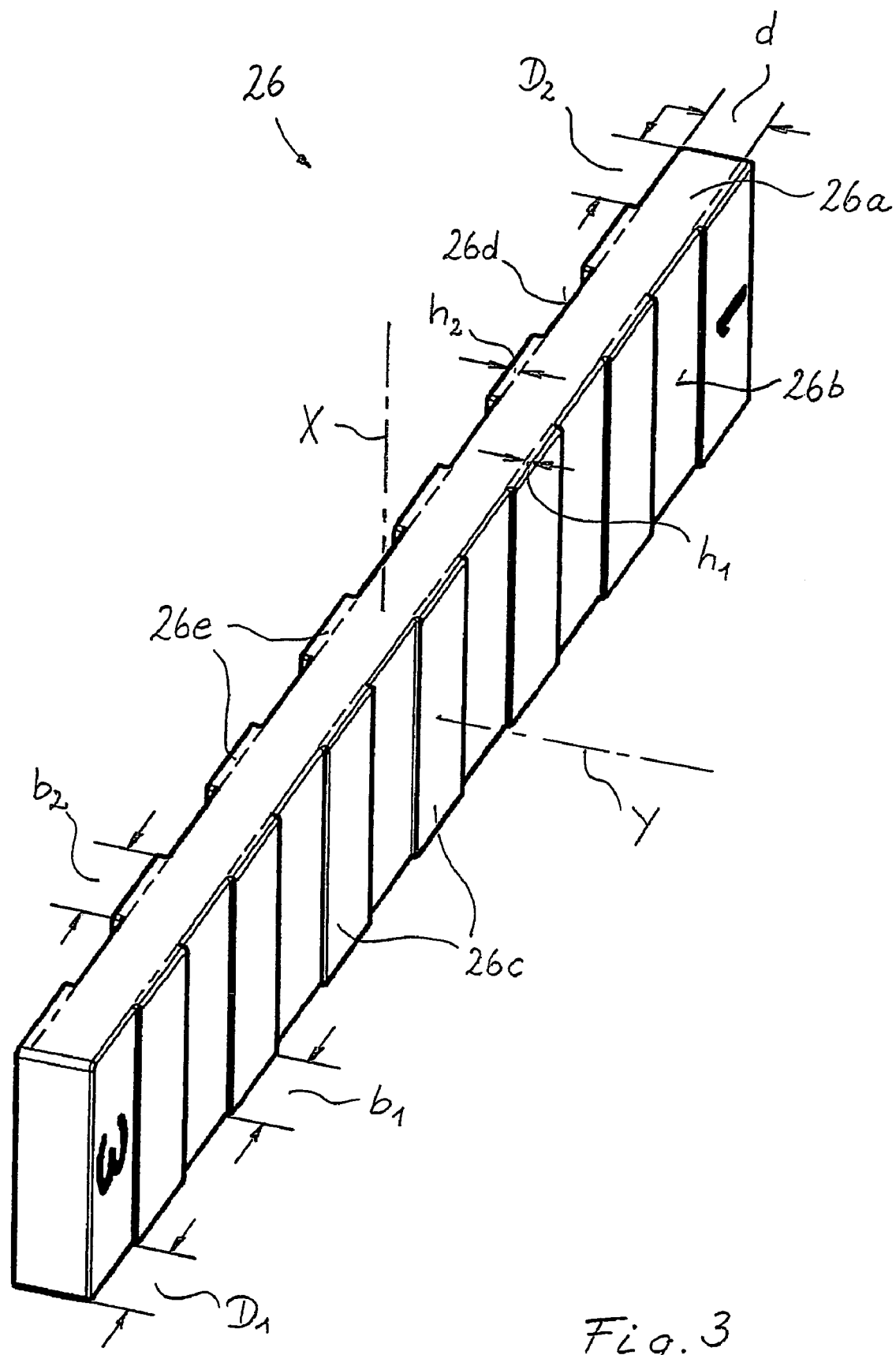
FIG. 3 is an enlarged perspective view of the strip unit in the first embodiment.

It can also be seen from FIG. 3 that the first protrusions 26c and the second protrusions 26e are located in alternating fashion along the base body 26a of the strip unit 26, specifically in such a way that on the end of the strip unit 26 marked "1" in FIG. 3, there is a second protrusion 26e, but no first protrusion 26c, while on the end marked "3" of the strip unit 26, there is a first protrusion 26c, but no second protrusion 26e. In very general terms, both the first protrusions 26c and the second protrusions 26e have a spacing $D_1$ and $D_2$, respectively, from the one end of the strip unit 26, which spacing differs from the spacing on the respective other end of the strip unit; in the exemplary embodiment shown, this other spacing has the value of 0.

Based on the above description, with a guide unit 20, a total of three tolerance compensation positions can be achieved:

In the first tolerance compensation position, the second protrusions 26e engage the recesses 24c, so that the contact faces 24a rest on the second surface 26d of the strip unit 26. In this state, the strip unit 26 protrudes past the contact face 24a of the contact unit 24 by the distance $(d+h_1)$. This first position is readily apparent to the installer from the fact that the marking "1" of the strip unit 26 is located adjacent to two notches 24e, acting as a counterpart marking, of the contact unit 24. This first tolerance compensation position corresponds to the orientation of the strip unit 26 shown in FIGS. 2 and 3.

The second tolerance compensation position is obtained by inverting the strip unit 26 by 180° about its vertical axis, marked X in FIG. 3, compared to the orientation shown in FIGS. 2 and 3. In this second tolerance compensation position, the first protrusions 26c now engage the recess 24c of the contact unit 24, so that the strip unit 26 rises above the contact face 24a by the distance $(d+h_2)$. For this position as well, a corresponding marking "2" is provided on the strip unit 26 (see FIG. 2).

The third tolerance compensation position is obtained, beginning with the orientation of the strip unit 26 shown in FIGS. 2 and 3, by inverting the strip unit about its transverse axis, marked Y in FIG. 3, by 180°, so that the marking "3" of the strip unit 26 is located in the vicinity of the marking notches 24e. In this case, the second protrusions 26e then rest on the end faces 24a of the contact ribs 24b, so that the strip unit 26 rises above the contact face 24a of the contact unit 24 by the distance $(d+h_1+h_2)$. The same rise is also obtained if the end face of the strip unit 26 that is not marked "1", "2", or "3" is located adjacent to the marking notches 24e of the contact unit 24.

The marking notches 24e can moreover be used for introducing a suitable tool as well, to make it possible to detach the strip unit 26 from the contact unit 24.

To make it possible to compensate for even slight fluctuations in tolerances between the slot bottom 22a of the guide slot 22 and the guide attachment 20, or more precisely between the slide face 22b of the guide slot 22 and the respective counterpart slide face 20a of the guide attachment 20 formed by the end faces of the first protrusions 26c or the second protrusions 26e, a spring 28 is received in at least one of the recesses 24c of the contact unit 24 and prestresses the strip unit 26 against the slide face 22b.

It should also be noted that the contact unit 24 has a guide edge 24d, extending all the way around, into which the strip unit 26 can be placed.

Figure 4:
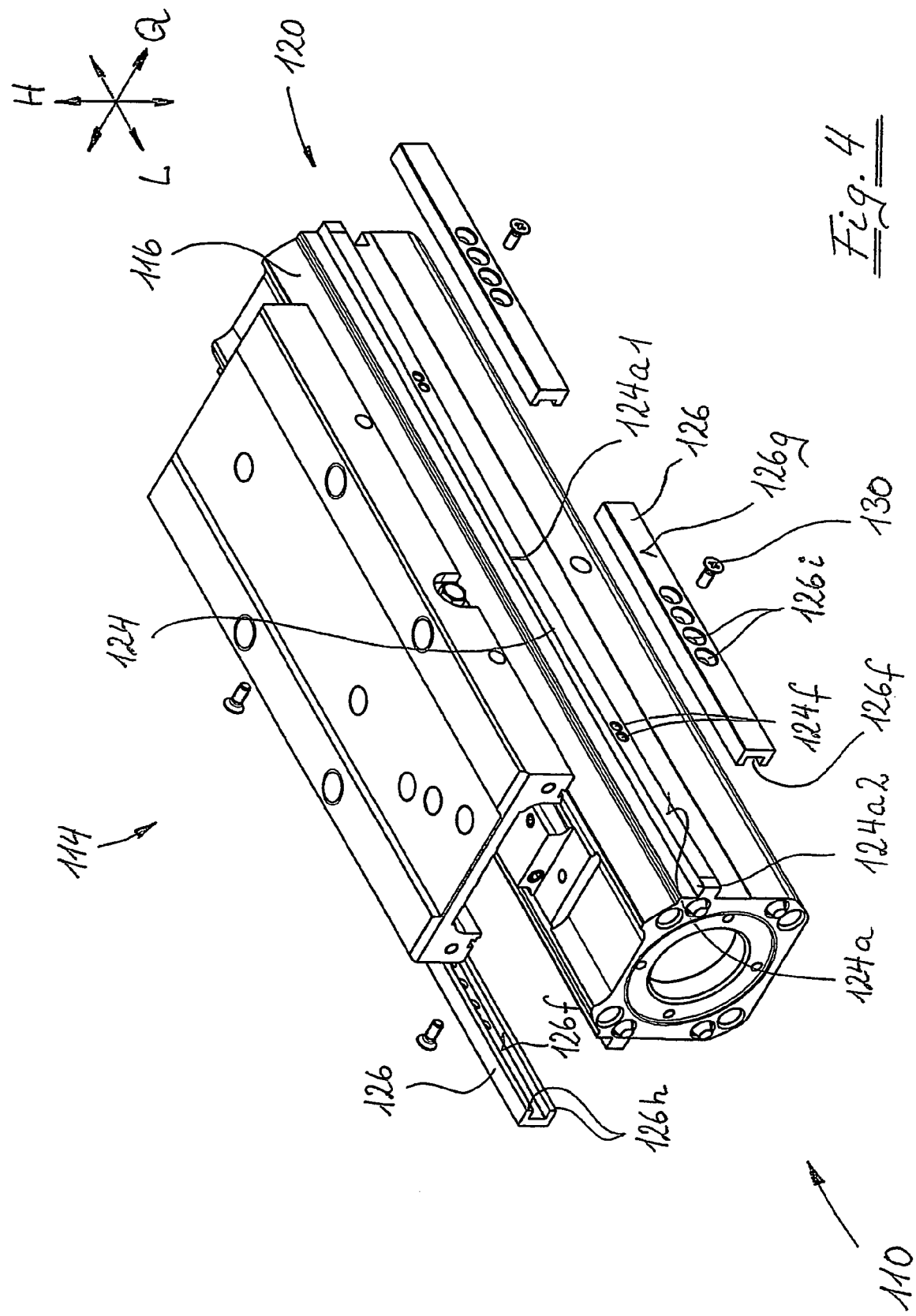
FIG. 4 shows a view similar to FIG. 2 of an embodiment according to the second aspect of the invention.

In FIG. 4, a second embodiment of a linear unit of the invention is shown, which is essentially equivalent to the embodiment of FIG. 2. Analogous elements are therefore provided with the same reference numerals in FIG. 4 as in FIG. 2, but increases by 100. Moreover, the embodiment of FIG. 4 will be described below only to the extent that it differs from the embodiment of FIG. 2, the description of which is otherwise hereby expressly referred to.

In the linear unit 110 of FIG. 4, the rotor 114 has a tolerance compensation which is embodied on the order of a sliding wedge. Specifically, the contact unit 124 has a contact face 124a, which forms an acute angle with a plane that is defined by the travel direction and the vertical direction. In FIG. 4, this is best seen from the fact that the spacing of the contact face 124a from the nut body 116 is less at 124a1 than at 124a2. The strip unit 126 is also correspondingly wedge-shaped; that is, whenever its counterpart contact face 126f rests over its full surface on the contact face 124a of the contact unit 124, its counterpart slide face 126g extends essentially parallel to the plane defined by the travel direction L and the vertical direction H.

Two guide strips 126h of the strip unit 126 assure that the strip unit 126, in the state in which it has been placed on can easily be displaced back and forth in the travel direction L.

In exemplary embodiment shown in FIG. 4, the strip unit 126 has a plurality of fastening holes 126i, and the contact unit 124 has a plurality of fastening bores 124f that have a female thread. The fastening holes 126i each have a spacing from one another that is twice as great as the spacing of the fastening bores 124f. In this way, the strip unit 126 can be fixed on the contact unit 124 in a total of eight different relative positions in the travel direction L. In each of these relative positions, the strip unit 126 has a different spacing from the nut unit 116 of the rotor 14.

It should also be noted that in the embodiment of FIG. 4, two such tolerance compensation devices are provided on each of the sides of the nut body 116, while in the embodiment of FIG. 2, only one tolerance compensation device is provided on each side of the nut body 16 of the rotor 14.

It will be understood that each of the elements described above, or two or more together, may also find a useful application in other types of constructions differing from the types described above.

While the invention has been illustrated and described as embodied in a linear unit with tolerance compensation, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is new and desired to be protected by Letters Patent is set forth in the following claims.

The invention claimed is:

1. A linear unit, comprising a substantially rigid housing unit having an engagement slot; a rotor that is received in said housing unit so as to be movable back and forth in a travel direction, said rotor having at least one engagement device which engages said engagement slot in said housing unit in an engagement direction extending substantially orthogonally to the travel direction, said at least one engagement device including not only a contact unit associated with said rotor, but also a strip unit; and means for compensating a position of said strip units relative to said contact unit, wherein said compensating means include a contact face provided on said contact unit and at least one recess provided on said contact face, at least one first protrusion provided on a first surface of said strip unit and at least one second protrusion provided on a second surface of said strip unit facing away from said first surface, wherein said at least one first protrusion and said at least one second protrusion have heights which are different from one another, and wherein said at least one first protrusion and said at least one second protrusion are dimensioned such that they are introducible into said recess in said contact face of said contact unit.

2. A linear unit as defined in claim 1, wherein said strip unit has two longitudinal ends, said at least one first protrusion and said at least one second protrusion having a different spacing from said longitudinal ends of said strip unit, said contact unit being provided with guide edges which define a relative position of said strip unit and said contact unit.

3. A linear unit as defined in claim 1, wherein said strip unit has a plurality of first protrusions selected from the group consisting of said first protrusions, said second protrusions, and both.

4. A linear unit as defined in claim 1; and further comprising at least one spring element arranged between said contact unit and said strip unit and prestressing said strip unit in sliding engagement with a slot bottom of said engagement slot.

5. A linear unit as defined in claim 1, wherein said compensating means include a contact face provided on said contact unit and forming an acute angle with a slide face, and a counterpart contact face provided on said strip unit and oriented toward said contact face and extending substantially parallel to the latter, and a counterpart slide face facing toward slide face and extending substantially parallel to the latter, said strip unit being fixable on said contact unit in the travel direction in a plurality of relative positions.

6. A linear guide unit as defined in claim 1, wherein at least one of said contact unit and said strip unit has at least one guide element for guiding a respective other of said contact unit and said strip unit.

7. A linear guide unit as defined in claim 1, wherein one said engagement device is provided on each of two sides of said rotor.

8. A linear guide unit as defined in claim 1; and further comprising at least one another such engagement device, said both engagement devices being provided on at least one side of said rotor.

9. A linear unit, comprising a substantially rigid housing unit having an engagement slot; a rotor that is received in said housing unit so as to be movable back and forth in a travel direction, said rotor having at least one engagement device which engages said engagement slot in said housing unit in an engagement direction extending substantially orthogonally to the travel direction, said at least one engagement device including not only a contact unit associated with said rotor, but also a strip unit; and means for compensating a position of said strip units relative to said contact unit, wherein said compensating means include a contact face provided on said contact unit and forming an acute angle with a slide face, and a counterpart contact face provided on said strip unit and oriented toward said contact face and extending substantially parallel to the latter, and a counterpart slide face facing toward slide face and extending substantially parallel to the latter, said strip unit being fixable on said contact unit in the travel direction in a plurality of relative positions, and wherein said strip unit of said at least one engagement device has a plurality of fastening holes.

10. A linear guide unit as defined in claim 9, wherein said contact unit of said engagement device has a plurality of fastening holes.

11. A linear guide unit as defined in claim 10, wherein a spacing of said fastening holes of said strip unit and a spacing of said fastening holes of said contact unit differ from one another.

* * * * *